Sept. 30, 1969   W. E. BUDD ET AL   3,470,091
TREATMENT OF POLLUTED STREAMS IN PLACE
Filed Feb. 8, 1968   4 Sheets-Sheet 4

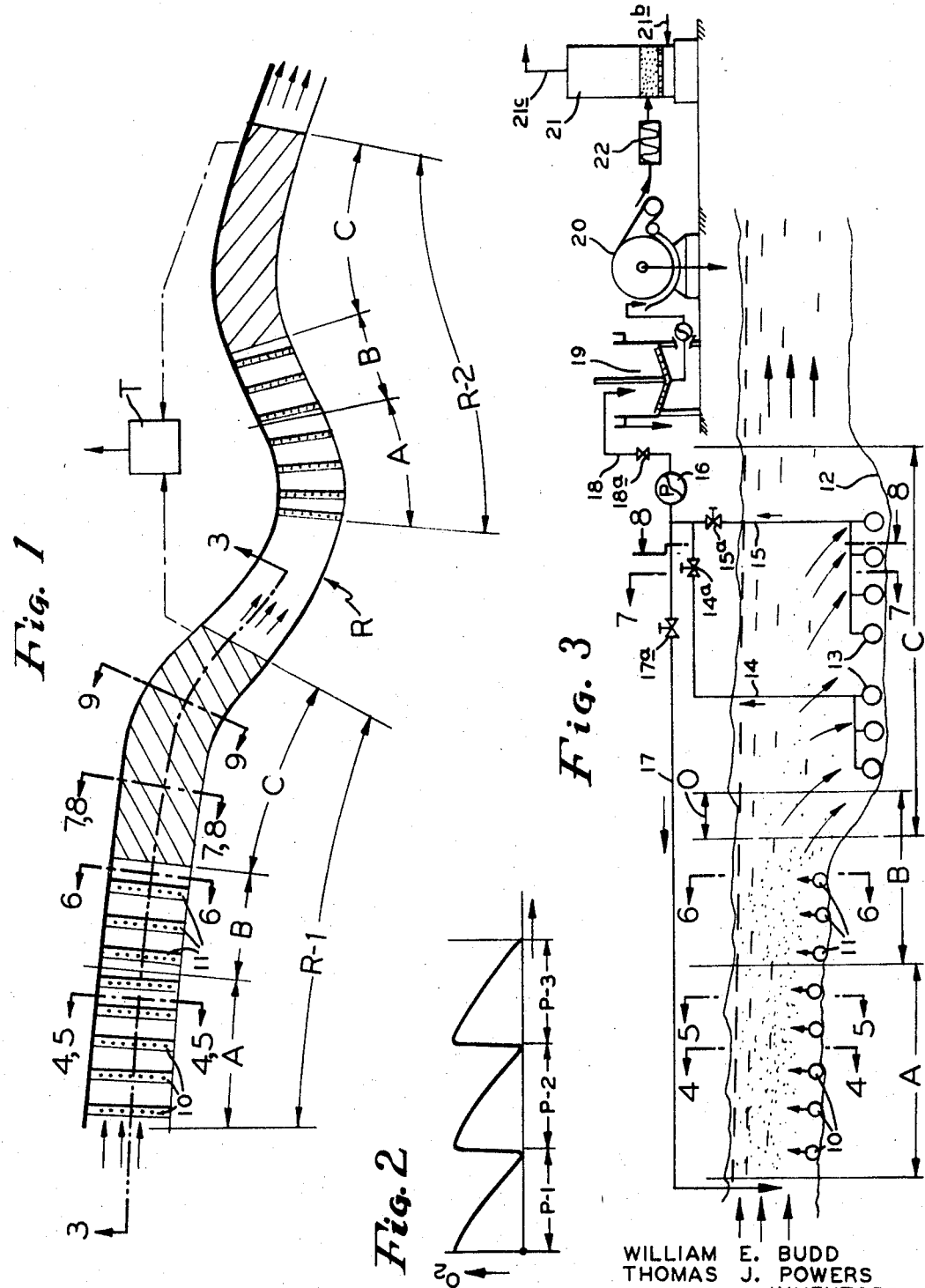

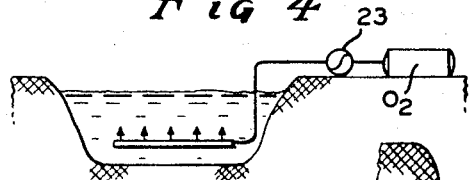
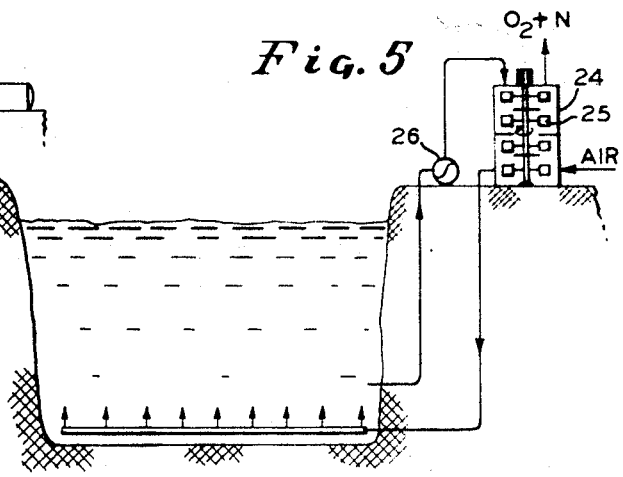
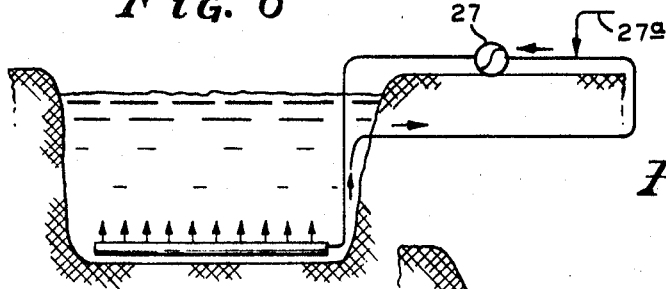
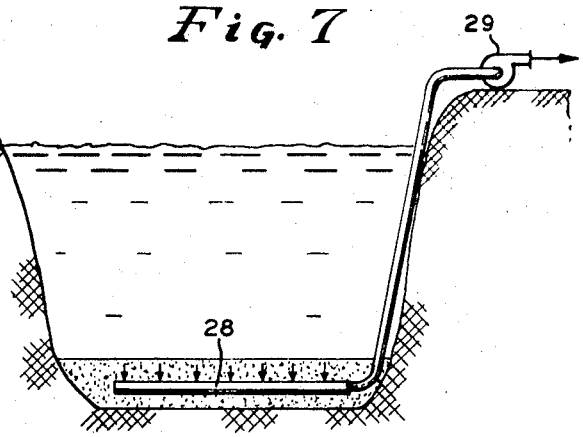
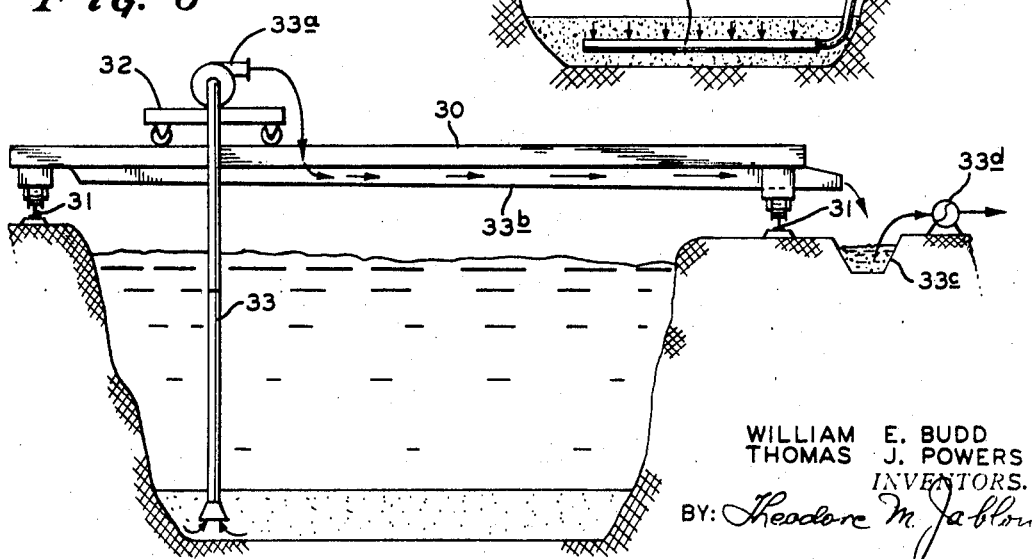

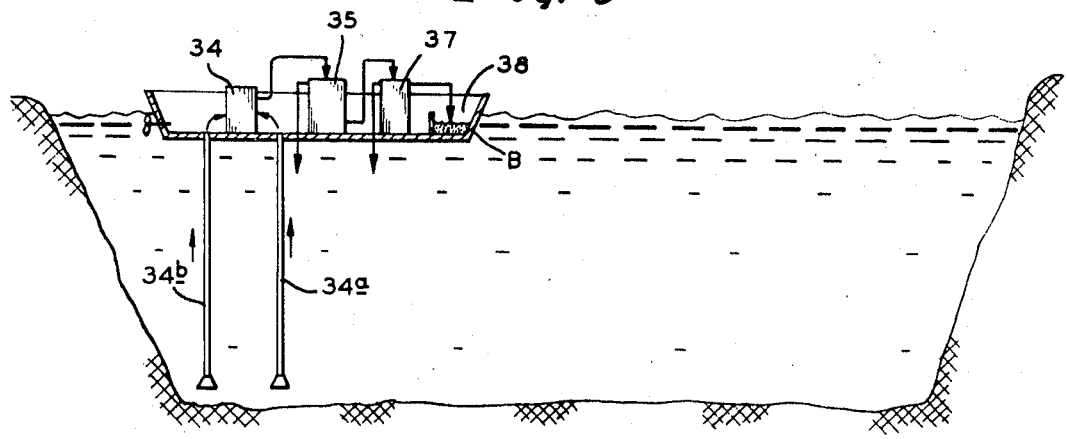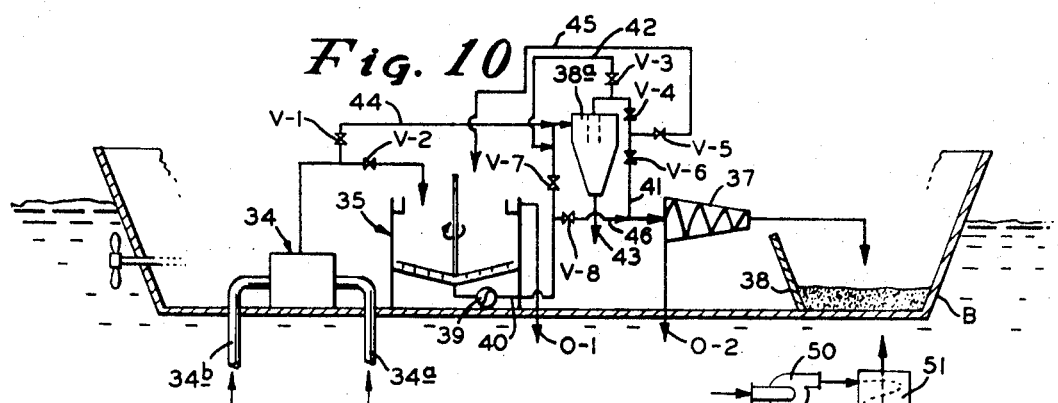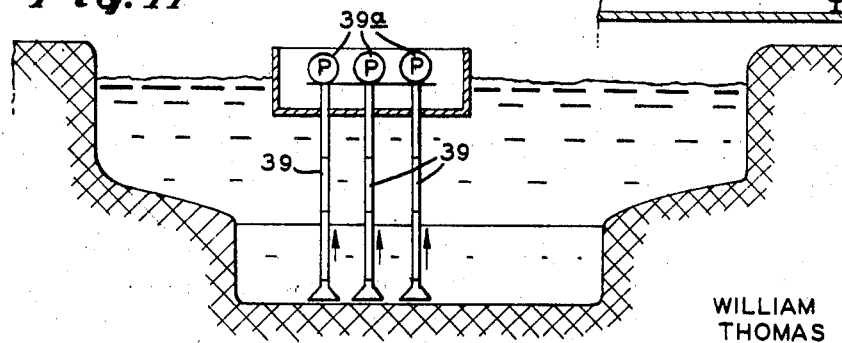

WILLIAM E. BUDD
THOMAS J. POWERS
 INVENTORS.

BY: Theodore H. Jablon

ATTORNEY.

United States Patent Office 3,470,091
Patented Sept. 30, 1969

3,470,091
TREATMENT OF POLLUTED STREAMS IN PLACE
William E. Budd, Ridgefield, Conn., and Thomas J. Powers, Midland, Mich., assignors to Dorr-Oliver Incorporated, Stamford, Conn., and The Dow Chemical Company, Midland, Mich., as joint owners, both corporations of Delaware
Filed Feb. 8, 1968, Ser. No. 703,944
Claims priority, application Great Britain, Feb. 21, 1967, 8,248/67
Int. Cl. C02c 1/02, 5/04; C02b 1/20
U.S. Cl. 210—10                                           27 Claims

ABSTRACT OF THE DISCLOSURE

This invention relates to a system and a method for combating the pollution of streams or rivers or canals, by treating the polluted water collectively in the flowing stream itself, instead of separately treating the individual contributing sources of pollution in order that the construction of numerous shore-located individual expensive sewage treatment plants may be forestalled or avoided.

This system provides for applying aeration- and flocculation treatment to a predetermined length of the stream itself, so that the resulting floc structures from that treatment, weighted by entrapped inert solids, will settle in a downstream adjoining sedimentation zone as sludge which may be removed or pumped away periodically.

---

The invention proposes to apply purification treatment to the stream while passing through a suitable predetermined length or section of the river bed, allowing the treated organic matter or pollutants to subsequently settle on the bottom of the stream as sludge. Accordingly, a suitable combination of conditioning treatment followed by sedimentation is performed in the river bed itself. Following this conditioning treatment in the stream the sludge is removed or harvested from the sedimentation zone at the river bottom by suitable withdrawal means, while the thus purified stream moves on. The sludge thus recoverable may be subjected to concentration or de-watering followed by disposal treatment of the sludge concentrate or cake.

With the flowing stream carrying the polluting matter to a treatment station located in the stream channel itself, the treatment preferably comprises the steps of oxygenating the polluted stream by either pure oxygen or air to convert the pollutants into biologic floc structures, or increasing the settleability of the floc structures by the introduction into the stream of an agglomerating flocculating material preferably of the polymeric class, causing the thus conditioned organic solids weighted by sand, silt, or clay particles or the like present in the stream, to settle on the bottom of the stream bed as sludge, and of removing the resulting sludge from the settling zone in the stream. A portion of the sludge thus removed may be recirculated to the oxygenation zone and/or to the flocculation zone in the stream for seeding, while waste sludge is subjected to solids concentrating treatment for disposal. The weighting particles are present in the polluted stream from naturally occurring dust or run-off reaching the stream.

Preferably, the oxygenating medium or fluid is introduced in a first conditioning zone or station as by means of diffuser tubes located at or near the bottom of the stream, thus taking advantage of the depth of the stream or river to attain optimum absorption or dissolution and maximum utilization of the oxygen supply in the formation of the relatively fragile biologic floc structures. The flocculation agent in solution is similarly introduced into the stream, for instance in a second conditioning zone or station which may be located downstream from the flocculation zone. The floc structures are thus further coalesced or agglomerated as well as weighted by trapped particles of inorganic particles, so they will settle on the stream bottom in the third or settling zone downstream from the treatment zone. The sludge is allowed to drift into this sedimentation zone, and may collect for instance, in a depression or pocket of the river bottom, and which may overlap with the preceding flocculation zone. The sludge is pumped up from the pocket of the settling zone, and is subjected to solids concentration preferably to the extent of producing a wet cake material which may be subjected directly to incineration producing but a mixture of sand, silt, and ash suitable for use as fill.

Features of the invention are concerned with various ways of introduction into the stream of the oxygenating fluid and of the flocculating agent, as well as with various modes of sludge withdrawal, all depending more or less upon the nature of the stream and the degree of its pollution, and particularly also upon the depth and width of the stream and upon the profile of the river bed.

For example, in the case of a relatively narrow (non-navigable) stream, one way of introducing the oxygenating fluid is by way of a gas pump or compressor forcing pure oxygen or air through diffuser pipes or the like located at the bottom of the stream. Flocculating solution is then introduced by a similar distributing pipe arrangement in the next downstream treatment zone. Subsequent sludge withdrawal downstream from the flocculating zone may be carried out through a stationary sludge withdrawal pipe system located at the bottom of the stream, or a bridge structure across the stream may carry a depending sludge withdrawal pipe movable thereon back and forth across the stream, while the bridge structure itself may be movable parallel to itself.

In the case of wide navigable streams or rivers oxygenation may be provided through the diffuser pipes at the river bottom more economically by the supply of previously dissolved oxygen. That is to say, a relatively small auxiliary stream of water preferably derived from the river itself is passed through a shore-based oxygen absorption column. This provides a supply of water highly saturated with dissolved oxygen, to be forced through the diffuser pipes or the like into the stream. Inasmuch as this mode of oxygen introduction is characterized by a relative absence of turbulence as compared with the direct introduction of a gaseous oxidizing medium, the introduction of the flocculating agent or solution may be effected within the oxygenation zone or even in a zone preceding it, since undue turbulence would not interfere with the initial formation of the fragile biologic floc structures.

Furthermore, in a wide navigable stream where the ship lanes must remain unobstructed, it is practical and preferable to have the sludge withdrawal and pumping facilities located upon a barge shuttling back and forth across the river in the sludge collecting zone. The barge operation is self-contained having on board its own power generating plant, as well as sludge thickening and concentrating facilities as well as storage for the concentrated sludge to be transferred periodically to shore-based disposal facilities such as a combustion plant for wet concentrated sludge.

Or else, a compact sludge combustion unit may be carried on the barge, wherein the sludge concentrated to the consistency of moist cake material may be subjected directly to complete thermal oxidation.

The foregoing purification operation with sludge collection and harvesting, may be repeated downstream from the first operation, although one barge and one combustion plant may serve both operations.

Other features and advantages will hereinafter appear.

FIG. 1 is a diagrammatic plan view of a river bed, with a plurality of purification and sludge collecting operations arranged in series, each operation comprising a sequence of treatment zones, and shore-based sludge combustion facilities.

FIG. 2 shows the diagram of an oxygen profile of the oxygenation zone, attainable by stepwise sequential applications of oxygen in the oxygenation zone.

FIG. 3 is a diagrammatic longitudinal part-sectional view of the river bed, taken on line 3—3 of FIG. 1, showing the sequential zones of the purification operation, along with provision for seed sludge recirculation and sludge collection in a pocket or sump provided in the river bottom, and shore-based sludge handling apparatus.

FIG. 4 is a vertical cross-section taken on line 4—4 of FIG. 3, diagrammatically illustrating one mode of operation of the oxygenation zone.

FIG. 5 is a vertical cross-section taken on line 5—5 of FIG. 3, diagrammatically illustrating another mode of operation of the oxygenation zone.

FIG. 6 is a vertical cross-section taken on line 6—6 in FIG. 3, diagrammatically illustrating a mode of operating the flocculation zone.

FIG. 7 is a vertical cross-section taken on line 7—7 in FIG. 3, diagrammatically illustrating one mode of operation of the sludge collecting zone, employing stationary sludge withdrawal piping.

FIG. 8 is a vertical cross-section taken on line 8—8 in FIG. 3, diagrammatically illustrating another mode of operation of the sludge collecting zone, employing bridge-supported movable sludge withdrawal means.

FIG. 9 is a vertical cross-section taken on line 9—9 of the sedimentation zone, diagrammatically illustrating still another mode of operation of the sludge collecting and withdrawal zone, employing a self-propelled barge carrying sludge-handling apparatus including a solid bowl type centrifuge producing a cake material, and storing facilities therefor.

FIG. 10 is an enlarged diagrammatic view of the barge in FIG. 9, giving a clearer view of the sludge concentrating facilities thereon.

FIG. 10a is a fragmentary view of one end portion of the barge of FIG. 10 with a sludge combustion unit substituted for the sludge storage.

FIG. 11 is a vertical cross-section of the sludge collecting zone of the river bed, diagrammatically showing the barge equipped with sludge withdrawal pipes of variable length, cooperating with the sludge collecting pocket or depression in the river floor.

Figure 12:
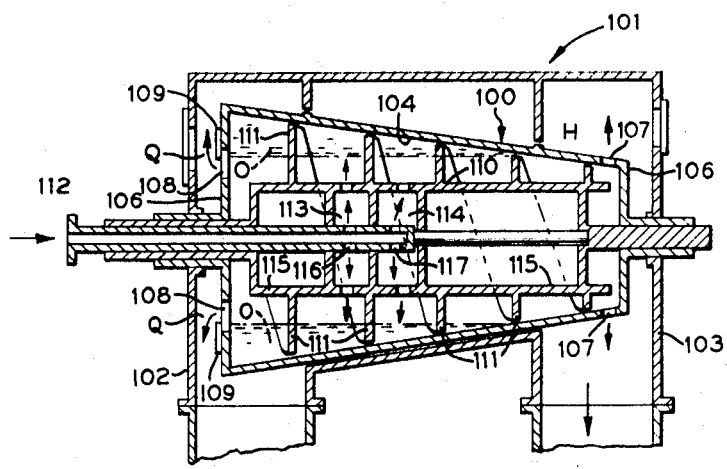
FIG. 12 is a semi-diagrammatic longitudinal sectional view of the solid bowl type centrifuge in FIG. 10.

According to the invention as indicated in FIG. 1, the stream of river R carrying the polluting matter may be subjected to purification treatment herein termed "In-Place Treatment" or "In-Stream Treatment" in the manner illustrated in FIGS. 1 and 2. Thus, a first purification operation may be performed in a length R–1 of the river bed. If necessary or desired, further purification operations may be carried out in a subsequent length of river bed R–2. The settled sludge resulting from these operations may be pumped from the river bottom, and dewatered or concentrated sufficiently to produce a wet cake material to be subjected to combustion in a suitable shore-base thermal oxidation plant T producing an inert residue of inorganic particles and ash.

The treatment site in the stream or river bed may be selected in regard to the natural suitability or profile of the river bed preferably where substantially level bottom is available, or the profile may be corrected as by dredging or by alterations of the bottom and of the river banks. The choice of the site may also be governed by the location of the source of pollution. While avoiding or forestalling the construction of numerous expensive individual municipal sewage plants, the invention nevertheless also contemplates judicial combination of "In-Stream Treatment" with shore-based treatment plants which may effect BOD removal to varying degrees, and which may deliver effluent into the stream, and dewatered sludge to the Thermal Oxidation Plant that receives the dewatered sludge from the river bed.

As an example, the first purification operation itself, according to FIGS. 1 and 3, comprises a first phase or treatment zone A where air or pure oxygen is introduced by suitable diffuser pipes 10 or the like located at the river bottom. Those pipes may be of a suitable plastic material weighted down to hug the river bottom especially if the oxidizing medium is a gas. If oxygen-saturated water is employed the weight of the pipe and contents has more nearly balanced buoyancy. The required length of the oxygenation zone A depends upon the profile and depth of the river bed as well as upon the degree of purification required. Provision may be made for extending the effectiveness of that zone. It will be understood that the very depth of the stream or river bed provides maximum opportunity for oxygen utilization.

The river flow carrying the initially formed fragile biologic floc structures then passes through the flocculation zone B where pipes 11 extending across the river bottom introduce dissolved flocculating agent effective in agglomerating and coalescing the biologic floc structures into sturdier flocs weighted by entrapped inorganic particles and thus conditioned for sedimentation as the river flow then passes through the subsequent sedimentation zone C. Preferably, the sedimentation zone is defined by a pocket or depression 12 in the river bottom for intercepting and collecting the descending flocs. Zones B and C are here shown to have an overlap O indicating the merging of these zones into one another. Sludge withdrawal apparatus in this embodiment is shown in the form of a stationary sludge withdrawal pipe system 13 effective over the area of the sludge pocket, although floating or bridge-supported sludge withdrawal means may be employed, such as will be furthermore described below.

However, in zone C of FIG. 3 two sets 14 and 15 of sludge withdrawal pipes are shown, each set having a sludge suction pipe leading to the intake of a sludge pump 16, which suction pipes have control valves 14a and 15a respectively. The delivery side of the pump has a recycle pipe conduit 17 with control valve 17a which may operate to return a portion of the sludge as seed sludge to the oxygenating zone A, while the balance of the pumped sludge through conduit 18 and control valve 18a goes to waste. Disposal of the wasted sludge in this embodiment is indicated by a shore-based operation including a sedimentation sludge thickener 19 providing an underflow or thickened sludge for further dewatering in a rotary drum or a continuous belt filter 20 which in turn provides a wet filter cake for combustion in a thermal oxidation unit 21 capable of direct combustion of the moist filter cake. In the unit 21 as herein exemplified, combustion of the material is effected by complete and odorless thermal oxidation in a bed 21a of hot fluidized sand. A fuel supply for the unit is indicated at 21b with stack gases escaping at 21c. A continuous positive displacement pump 22 such as a Moyno pump is indicated for feeding filter cake material at a controlled rate to the combustion unit which in turn delivers only an invert very small volume of inert particles and ash. Overflow from the thickener and filtrate liquid from the filter may be disposed of in any usual or suitable manner.

The cross-sectional view of zone A in FIG. 4 illustrates the application of a gas in the oxygenation zone, by means of gas pump 23. Unless air is applied, pure $O_2$ may be provided from pressure cylinder or from an $O_2$-producing plant. The application of the gaseous medium may be economically preferable where the purification treament is applied to a relatively smaller or non-navigable stream, say of 10 to 30 ft. width and perhaps 5 to 10 ft. deep. Other aeration systems applicable may include turbine induced mechanical aeration, or a diffuser aeration system which in principle may be similar to the one shown in U.S. Patent No. 2,708,571 (Inka). For very shallow streams surface or brush aeration may be applied.

In the case of larger or navigable streams or rivers, say, of 200 to 300 ft. width and 25 to 35 ft. deep, it may be economically preferable to avoid direct application of a gaseous medium in zone A in favor of introducing or diffusing into the stream prepared dissolved oxygen, that is water highly saturated with dissolved oxygen. According to the modification in FIG. 5 also representing a cross-sectional view of zone A, the diffuser system at the river bottom is supplied with dissolved oxygen from an $O_2$-absorption tower 24 capable of producing for example 100 p.p.m. $O_2$ dissolved in the water. Water entering the absorption column or tower at the top flows countercurrent to a rising flow of air or oxygen introduced at the bottom, while a rotary contact mechanism 25 may enforce intense contact between the two media. The oxygen-saturated water may gravitate to and through the distributing or diffuser system, while river water or water from any other suitable source is supplied as by pump 26 to operate the absorption tower.

The cross-sectional view in FIG. 6 of zone B illustrates what is herein termed the flocculation and floc weighting operation. Accordingly, a pump 27 may draw river water for delivery into a distributing or diffuser system, while a controlled amount of a suitable soluble flocculating agent has been added either at the intake side of at the delivery side of the pump.

It is not absolutely necessary to have zone B operate subsequent to zone A, inasmuch as under certain conditions, the sequence of these operations may be reversed, or they may proceed in the presence of each other in the same operating zone. Such a condition may exist when turbulence due to the introduction of the oxygenating medium is minimized, that is when the dissolved oxygen manner of introduction is employed, which method because of the gradual release of the oxygen also tends towards efficient oxygen utilization.

The operation of the sludge withdrawal zone C also may be carried out in various ways depending upon the size and profile of the stream, and whether or not the stream or river is of the size and type that should be navigable.

Thus, for the smaller streams in the range above indicated, the cross-section of zone C in FIG. 7 shows a stationary system 28 of horizontal sludge withdrawal pipes located in the sludge collecting pocket or sump, with a pump 29 drawing the sludge from the sump for delivery partially into the recycle conduit and partially to waste and to disposal.

According to the modification in FIG. 8 representing another cross-section of zone C, the sludge withdrawal apparatus may comprise a bridge structure 30 across the stream, which structure may be movable parallel to itself on tracks 31. A carriage 32 movable back and forth across the bridge supports a sludge withdrawal pipe 33 depending into the sludge collecting pocket of the sedimentation zone, and connected to a pump 33a. This pump may deliver into a sloping trough 33b extending across the stream and carried by the bridge. The sludge pumpage thus flows into a stationary channel or trough 33c on shore extending parallel to the tracks. From these a pump 33d may deliver the sludge to the concentrating and disposal plant.

In case the stream be in the category of navigable rivers for example in the size ranges above set forth, and where the shipping lanes must remain unobstructed, a self-propelled barge B operating independent of fixed installations may be advantageously employed and equipped in the manner illustrated in FIGS. 9 and 10. The equipment carried by the barge as herein shown comprises a powered sludge pump 34 for drawing sludge through one or more depending dredge-like or telescoping sludge withdrawal pipes 34a as the barge is moved back and forth across the river in a suitable operating pattern designed to cover the sludge collecting area at the bottom of the stream. Because of its mobility the barge also carries self-contained sludge-dewatering and sludge concentrating apparatus as well as storage capacity for the sludge. After periods of sludge handling operations of suitable length the barge may be held at a landing in order that the dewatering sludge or cake material may be unloaded for final disposal as by combustion in a shore-based thermal oxidation plant.

For that purpose, the equipment on the barge comprises in addition to the sludge pump 34, a sedimentation thickening tank 35 which may be of the continuously operating type where the rotary rake structure helps in the thickening operation. On board also is a suitable centrifugal machine 37 preferably of the solid bowl construction type to effect further concentration of the underflow or thickened sludge, and suitable for delivery of a moist cake material into a storage tank or bin 38. Eventually this cake material is transferred to the shore-based thermal oxidation plant.

On board the barge, sludge is subjected to a degritting operation to separate grit or silt from the organic matter. For that purpose, a hydrocyclone 38a may be disposed functionally between pump 34 and the thickener, or functionally between the thickener and the centrifuge.

Suitable piping and valves V-1 through V-8 are provided for optional use of either one of these modes of operation.

According to the one mode of operation, with the proper setting of these valves, a pump 39 may transfer underflow sludge from the thickener through conduit 40 to the inlet of the cyclone. Degritted overflow sludge through conduit 41 enters the wide end of the centrifuge 37 which in turn delivers cake material into the storage bin 38. A return conduit 42 is provided for recirculating degritted sludge to the inlet of the cyclone at a controllable rate. Separated grit 43 is delivered as cyclone underflow.

According to the other mode of operation, with the proper setting of the valves, the pump 34 will deliver sludge directly to the cyclone through conduit 44, while degritted sludge is transferred through conduit 45 to the thickener. Degritted underflow sludge from the thickener reaches the centrifuge 37 through pump 39, the first part of conduit 40, and cross-over conduit 46.

In FIG. 10a, the storage bin 38 for the cake material has been replaced by a compact combustion unit 47 wherein the cake material is subjected to complete thermal oxidation. A Moyno pump 48 or the like may feed the cake material from centrifuge 37 into the combustion unit which may be of the cyclonic type disclosed in co-pending application of Peter J. Hubbard, Ser. No 649,381, filed Apr. 11, 1967. This unit has a fuel burner 49 admitting primary combustion air. Secondary combustion air is supplied to this unit from a blower 50 through an air preheater or heat exchanger 51 through which pass the combustion gases from the combustion unit. Overflow O-1 from the thickener and overflow O-2 from the centrifuge may discharge into the river.

In FIG. 11 the barge carries a multiple arrangement of depending sludge withdrawal pipes 39 each of which is shown to be served by an individual pump unit 39a. The depending pipes are indicated as of telescoping construction adaptable to the depth of the river bed, and capable of being withdrawn or shortened sufficiently for landing or moving the barge to a different location.

While the barge with sludge handling equipment may be self-contained including power-generating plant on board, other possibilities are to transfer some of the sludge concentrating operations to a shore-based installation, while storing the sludge on the barge in a more dilute state. However, the sludge concentrating machine on board the barge is preferably and practically a centrifuge, whereas on shore a drum filter or drum belt filter or other desired filter operation may be employed. The barge may be self-propelled or be maneuvered by a tug.

Following is a description of a solid bowl continuous conveyor type centrifuge herein employed for concentrating digested sludge to a desired cake consistency. According to the semi-diagrammatic example in FIG. 12, such a machine briefly termed a "solid bowl centrifuge," has a rotor structure 100 or bowl rotating in a housing 101 which may be sealed against the atmosphere. The housing has a discharge neck 102 located at the wide end of the rotor structure for delivering the overflow liquid fraction discharging from the narrow end of the rotor structure through a discharge neck 103 for further disposal in any suitable manner.

The rotor structure 100 comprises a bowl which has a truncoconically shaped body portion 104 provided with an end closure plate 105 at the narrow end and an end closure plate 106 at the opposite or wide end thereof. The separated solids or cake fraction representing the digested sludge discharges centrifugally from the bowl through openings 107 provided adjacent to the narrow end of the bowl. The opposite end closure plate 106 has overflow openings 108 associated with adjustable weir plates 109 determining the overflow level of the annular body O of liquid undergoing centrifugal separation in the bowl. Arrows Q at the wide end indicate delivery over these weir plates of the liquid overflow fraction.

Within the trunco-conically shaped rotor bowl of this machine there is rotatably mounted a conically shaped conveyor element 110 conforming to the inner contour of the bowl and adapted to be rotated at a differential speed relative to the rotation of the bowl, so that the spirally shaped flights 111 thereof will move the centrifugally separated solids comprising most of the digested solids out of the liquid body "O" to emergence onto the narrow end portion, the so-called beach portion "H" of the bowl, finally causing the material to discharge centrifugally through the openings 107 for disposal in the form of a relatively dry cake material delivered through neck 103.

The sludge enters this machine through an axially arranged stationary feed tube 112 introducing feed sludge, for example, into receiving chambers 113 and 114 formed in the hollow hub portion 115 of the flight conveyor element, and then through openings 116 and 117 into the annular liquid body "O" undergoing centrifugal separation in the bowl.

The chart in FIG. 2 illustrates a mode of operating the oxygenation zone, whereby oxygen or air is introduced in three sequential phases P-1, P-2, P-3, the amount of available oxygen (oxygen-profile) being indicated as a function of the progress of the stream through this zone.

In summary, according to the invention a flowing stream is used to transport the polluted liquor to a treatment station located in the stream channel. The treatment of the polluted waters is effected in the stream bed itself by the introduction preferably of high purity oxygen to satisfy the oxygen demand. The settling out of the organic material is effected by the addition of a coagulating agent or polymer, with sludge removal from the river bottom by means of stationary or movable sludge withdrawal equipment, and recycle of sludge solids to the oxygenation zone or station if required. The waste sludge in turn is conditioned preferably to produce a wet cake material suited for final disposal in a thermal oxidation plant preferably one employing a fluidized bed of sand in the combustion chamber.

The oxygen may be introduced into the polluted stream at selected intervals in order to produce aerobic conditions within the stream, with an oxygen profile potential such as indicated in FIG. 2. At the last oxygen station a coagulating agent, preferably a polymer, in solution is added in order to settle out the biological solids and entrapped inert weighting particles over a determined length of time. Solids are removed from the floor of the stream when required, by the sludge harvesting apparatus. The sludge that has been hydraulically removed from the stream bed is sent through a hydrocyclone to separate the silt or the like from the organic matter, the silt being delivered in the underflow and the organics in the overflow. The cyclone overflow thus freed of potentially abrasive solids may then be further forcibly dewatered as by centrifugation preferably in a solid bowl centrifuge machine. The thus dewatered organic solids or wet cake material may be transported to a central sludge disposal station where disposal of the organics is accomplished by complete thermal oxidation preferably in a bed of hot fluidized sand or the like providing complete and odorless combustion. The separated silt and the ash resulting from the combustion of the organic material may be used as fill. With the barge operation the apparatus may include a sludge combustion unit carried by the barge.

We claim:

1. The method of collective treatment of sewage or similar wastes from scattered sources, which comprises discharging untreated or partially treated waste from scattered sources into a stream, river or canal, establishing a treatment zone in said stream along a predetermined length of its course for collectively treating the combined waste carried by the stream along said predetermined length, and in said treatment zone subjecting the stream itself to oxidation and chemically induced flocculation while maintaining relatively mild agitation, to render the pollutants as settleable biologic floc structures weighted by naturally occurring inert solids such as dust and grit, allowing the weighted floc structures thus formed to drift into, and settle and collect in a subsequent sedimentation zone provided by the stream itself downstream from said treatment zone, and removing sludge from the bottom of said sedimentation zone, and subjecting the removed sludge to concentration treatment, and to disposal of the concentrated sludge.

2. The method according to claim 1, wherein the oxidation comprises introducing a gaseous oxidizing medium in the form of compressed oxygen at the bottom of the stream bed.

3. The method according to claim 1, wherein the oxidation comprises introducing an oxidizing medium at the bottom of the stream bed, in the form of water containing added dissolved oxygen, and wherein said chemically induced flocculation is effected substantially subsequent and downstream from said oxidation.

4. The method according to claim 1, wherein said sludge is removed substantially directly from all points of the stream bottom in said sedimentation zone.

5. The method according to claim 1, wherein oxidation and chemical flocculation are effected simultaneously by an oxidizing medium provided by oxygen dissolved in water and by a flocculating chemical in the presence of each other, and wherein said oxidizing medium and chemical are introduced at the bottom of said stream in said treatment zone.

6. The method according to claim 1, wherein said stream passes through a sequence of purification treatment stages each comprising oxidation and chemically induced flocculation in a treatment zone followed by sedimentation of the resulting floc structures in a downstream adjacent sedimentation zone, and wherein sludges pumped to shore from said sedimentation zones are subjected jointly to disposal treatment.

7. The method according to claim 1, wherein said sludge is removed substantially directly from all points of the bottom of said sedimentation zone.

8. A system for the collective treatment of sewage or similar wastes from scattered sources, having a purification treatment station which comprises a predetermined length in the course of a stream, river, or canal, providing therein a treatment zone between an upstream limit and a downstream limit;

duct means for delivering said wastes from said scattered sources into said stream at points upstream from said treatment zone;

diffuser means for an oxidizing medium, located at the stream bottom in said treatment zone;

first supply means providing said oxidizing medium to said diffuser means;

distributor means located at the stream bottom in said treatment zone, for introducing flocculating chemical, effective with said oxidizing medium to render the pollutants in said waste as settleable and substantially stable biologic floc structures weighted by naturally occurring inert solids such as grit and dust;

second supply means providing said flocculating chemical to said distributor means;

a sedimentation zone located at the downstream end of said treatment zone, and provided by the stream itself, for descending weighted floc structures to drift into and collect at the bottom of said zone as sludge;

means for effecting the removal of sludge from the bottom of said sedimentation zone;

means for effecting the concentration of the removed sludge; and, disposal means for the concentrated sludge.

9. The treatment system according to claim 8, wherein said sedimentation zone comprises a depression formed in the bottom of the stream for the collection of said sludge, and wherein said sludge removal means are constructed and arranged for effecting the removal of said sludge substantially directly from all points of the bottom of said depression.

10. The treatment system according to claim 8, wherein said sludge removal means comprise depending suction duct means movable to any point of said settling zone for effecting direct upward withdrawal of the sludge.

11. The treatment system according to claim 8, wherein both said diffuser means and said distributor means comprise a plurality of distributor pipes extending across the bottom of said stream.

12. The treatment system according to claim 8, wherein said distributor means for the flocculating chemical are located in a zone downstream from said diffuser means for the oxidizing medium.

13. The treatment system according to claim 8, wherein said first supply means comprise an oxygen absorption tower providing a supply of dissolved oxygen, with the addition of pump means for delivering water from the stream to said absorption tower operable for effecting absorption of oxygen in said water, and discharge duct means for gravitationally delivering oxygen-carrying water from said tower to said diffuser means.

14. The treatment system according to claim 8, wherein there is provided in said stream a sequence of purification treatment stations substantially as the one defined in claim 8, with the addition of means for pumping sludge from the sedimentation zones to shore, and shore-based means for subjecting said sludges jointly to disposal treatment.

15. The treatment system according to claim 14, wherein said shore-based disposal means comprises a sedimentation thickener producing thickened sludge, and dewatering apparatus for rendering said thickened sludge in the form of a moist cake material.

16. The treatment system according to claim 15, whereas said shore-based disposal means comprises a combustion unit for effecting complete thermal oxidation of said cake material.

17. A system for the collective treatment of sewage or similar wastes from scattered sources, having a purification treatment station which comprises a predetermined length in the course of a stream, river, or canal, providing therein a treatment zone between an upstream limit and a downstream limit;

duct means for delivering said wastes from said scattered sources into said stream at points upstream from said treatment zone;

diffuser means for an oxidizing medium, located at the stream bottom in said treatment zone;

first supply means providing said oxidizing medium to said diffuser means;

distributor means located at the stream bottom in said treatment zone, for introducing flocculating chemical effective with said oxidizing medium to render the pollutants in said waste as settleable and substantially stable biologic floc structures weighted by naturally occurring solids such as grit and dust;

second supply means providing said flocculating chemical to said distributor means;

a sedimentation zone at the downstream end of said treatment zone, and provided by the stream itself, for descending weighted floc structures to drift into and collect at the bottom of said zone as sludge;

and means for effecting the removal of sludge from the bottom of said sedimentation zone in the form of water-borne apparatus which comprises a barge on said stream; pump means carried by said barge, pump induction pipe means depending from said barge, and means for effecting the concentration and the dewatering of said removed sludge, and thereby providing a moist cake material.

18. The treatment system according to claim 17, with the addition of storage means for said cake material, associated with said apparatus.

19. The treatment system according to claim 17, with the addition of a combustion unit for effecting the complete thermal oxidation of said cake material.

20. The treatment system according to claim 17, wherein the length of said depending pipe is variable.

21. The treatment system according to claim 17, wherein said concentrating means comprise a thickener receiving thin sludge from the bottom of the said sedimentation zone through said depending induction pipe means and said pump means, for producing a more concentrated sludge in the thickener underflow, a cyclone for separating gritty matter from said sludge, and delivering said gritty matter as cyclone underflow, first conduit means for feeding said more concentrated sludge to the inlet end of the cyclone, a solid bowl type centrifugal machine, second conduit means for feeding degritted overflow sludge from said cyclone to said centrifugal machine for dewatering to produce a moist cake material, third conduit means for recirculating cyclone overflow sludge to the inlet of the cyclone, and control means for adjusting the rate of sludge recirculation.

22. The treatment system according to claim 21, with the addition of a combustion unit for effecting the complete thermal oxidation of said cake material.

23. The treatment system according to claim 17, wherein said concentrating means comprise a thickener receiving thin sludge from the bottom of the sedimentation zone through said depending induction pipe means and said pump means, for producing a more concentrated sludge in the thickener underflow, a cyclone functionally interposed between the delivery side of said pump means and said thickener, for separating gritty matter from the thin sludge delivered by the pump means, and delivering degritted sludge as overflow to the thickener, a solid bowl type centrifugal machine, and conduit means for delivering underflow sludge from the thickener to said centrifugal machine for dewatering to produce a moist cake material.

24. The treatment system according to claim 23, with the addition of a combustion unit for effecting the complete thermal oxidation of said cake material.

11

25. A system for the collective treatment of sewage or similar wastes from scattered sources, having a purification treatment station which comprises a predetermined length in the course of a stream, river, or canal, providing therein a treatment zone between an upstream limit and a downstream limit;
- duct means for delivering said wastes from said scattered sources into said stream at points upstream from said treatment zone;
- diffuser means for an oxidizing medium, located at the stream bottom in said treatment zone;
- first supply means providing said oxidizing medium to said diffuser means;
- distributor means located at the stream bottom in said treatment zone, for introducing flocculating chemical effective with said oxidizing medium to render the pollutants in said waste as settleable and substantially stable biologic floc structures weighted by naturally occurring solids such as grit and dust;
- second supply means providing said flocculating chemical to said distributor means;
- a sedimentation zone at the downstream end of said treatment zone, and provided by the stream itself, for descending weighted floc structure to drift into and collect at the bottom of said zone as sludge;
- and means for effecting the removal of sludge from the bottom of said sedimentation zone which comprise

12

- a bridge structure spanning said stream;
- a sludge pump supported on said bridge structure, provided with a depending sludge induction pipe,
- and track means for moving said pump back and forth across said bridge structure.

26. The treatment system according to claim 25, with the addition of tracks on each side of the stream for supporting the respective ends of said bridge structure, said bridge structure being movable parallel to itself on said tracks.

27. The treatment system according to claim 25, wherein the length of said depending pipe is variable.

References Cited

UNITED STATES PATENTS

| 2,270,869 | 1/1942 | Ditto et al. | 210—14 X |
| 3,118,832 | 1/1964 | Katzer et al. | 210—54 |
| 3,226,317 | 12/1965 | Albertson | 210—6 |
| 3,234,123 | 2/1966 | Hinde | 210—7 |

OTHER REFERENCES

Walker, P. G. W., Rotor Aeration of Oxidation Ditches, Water and Sewage Works, June 1962, pp. 238–241.

MICHAEL E. ROGERS, Primary Examiner

U.S. Cl. X.R.

210—7, 18, 53, 170, 199, 220, 242, 262, 527